US012343312B2

(12) United States Patent
Kamping et al.

(10) Patent No.: US 12,343,312 B2
(45) Date of Patent: Jul. 1, 2025

(54) TEAT FOR A BOTTLE AND A BOTTLE HAVING THE TEAT

(71) Applicant: KONINKLIJKE PHILIPS N.V., Eindhoven (NL)

(72) Inventors: Wiecher Ferdinand Kamping, Esch (NL); Johannes Tseard Van Der Kooi, Munein (NL); Sietse De Vries, Eindhoven (NL); Yolanda Bruinsma, Drachten (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 107 days.

(21) Appl. No.: 17/797,467

(22) PCT Filed: Feb. 3, 2021

(86) PCT No.: PCT/EP2021/052459
§ 371 (c)(1),
(2) Date: Aug. 4, 2022

(87) PCT Pub. No.: WO2021/160477
PCT Pub. Date: Aug. 19, 2021

(65) Prior Publication Data
US 2023/0083291 A1 Mar. 16, 2023

(30) Foreign Application Priority Data
Feb. 14, 2020 (EP) .................................... 20157393

(51) Int. Cl.
*A61J 11/00* (2006.01)

(52) U.S. Cl.
CPC .......... *A61J 11/005* (2013.01); *A61J 11/0015* (2013.01)

(58) Field of Classification Search
CPC .... A61J 11/005; A61J 11/0015; A61J 11/0035
USPC .......................................................... 215/11.4
See application file for complete search history.

(56) References Cited

U.S. PATENT DOCUMENTS 2,223,179 A * 11/1940 Lougheed ............ A61J 11/0015 215/11.1
2,517,457 A * 8/1950 Allen ..................... A61J 11/006 215/11.3
2,588,069 A * 3/1952 Allen ................... A61J 11/0035 215/11.1
4,505,398 A 3/1985 Kesselring
5,101,992 A * 4/1992 Serre ........................ A61J 11/02 215/11.1
D339,197 S * 9/1993 Ziegler ........................ D24/196
5,244,105 A * 9/1993 Serre ........................ A61J 11/02 215/11.1

(Continued)

FOREIGN PATENT DOCUMENTS

EP 1681044 A1 7/2006
GB 2215318 A 9/1989

(Continued)

OTHER PUBLICATIONS

International Search Report and Written Opinion dated Feb. 26, 2021 for International Application No. PCT/EP2021/052459 filed Feb. 3, 2021.

*Primary Examiner* — Ernesto A Grano

(57) ABSTRACT

A teat for a bottle has a nipple portion at which there is a recessed valve portion. The valve portion is domed outwardly.

15 Claims, 5 Drawing Sheets

(56) References Cited

U.S. PATENT DOCUMENTS

| | | | | | |
|---|---|---|---|---|---|
| 5,769,285 | A * | 6/1998 | Upham | A01K 9/005 | 215/11.1 |
| 6,994,225 | B2 * | 2/2006 | Hakim | A61J 11/0035 | 215/11.4 |
| D671,793 | S * | 12/2012 | Hakim | D7/392.1 | |
| D724,233 | S * | 3/2015 | Moore | D24/196 | |
| 9,820,914 | B2 * | 11/2017 | MacLeod | A61J 11/04 | |
| 10,149,800 | B2 * | 12/2018 | Brown | A61J 11/0015 | |
| 11,235,900 | B2 * | 2/2022 | Wilson | B65D 51/18 | |
| 2002/0063103 | A1 * | 5/2002 | Kiernan | A61J 11/045 | 215/11.4 |
| 2004/0164043 | A1 * | 8/2004 | Hakim | A61J 11/0035 | 215/11.1 |
| 2006/0175278 | A1 * | 8/2006 | Schlumpf | A61J 11/0015 | 215/11.1 |
| 2013/0056435 | A1 | 3/2013 | Itzek | | |
| 2015/0142054 | A1 | 5/2015 | Itzek | | |
| 2022/0110834 | A1 * | 4/2022 | Kamping | A61J 11/001 | |

FOREIGN PATENT DOCUMENTS

| | | | |
|---|---|---|---|
| GB | 2226014 | A | 6/1990 |
| JP | 2014166267 | A | 9/2014 |
| JP | 2018019752 | A | 2/2018 |
| WO | 98/46191 | A1 | 10/1998 |

* cited by examiner

TEAT FOR A BOTTLE AND A BOTTLE HAVING THE TEAT

CROSS REFERENCE TO RELATED APPLICATIONS

This application is the U.S. National Phase application under 35 U.S.C. § 371 of International Application No. PCT/EP2021/052459 filed Feb. 3, 2021, which claims the benefit of European Patent Application Number 20157393.8 filed Feb. 14, 2020. These applications are hereby incorporated by reference herein.

FIELD OF THE INVENTION

This invention relates to bottle teats, for example for milk feeding bottles for infants.

BACKGROUND OF THE INVENTION

The invention relates generally to a teat for use with a bottle for containing a drinking liquid. The most common use for such bottle teats is for milk bottles for babies (or other suckling mammal babies). However, a teat may of course be used by infants for drinking other drinks.

A teat generally comprises a hollow teat body including a deformable hollow mouthpiece for a user of the teat to suck on during a liquid intake action. The sucking action displaces liquid in a downstream direction through the teat body and out of the teat through the mouthpiece.

An important issue in the field of bottle feeding is the desire to mimic natural breast feeding as well as possible. A first advantage of this is that a bottle-fed infant is allowed to perform a liquid intake action in a familiar way, without the occurrence of unexpected effects.

A second advantage is that a bottle-fed infant is able to maintain the capability to feed on the breast, which capability may be hindered when bottle feeding does not stimulate certain natural reflexes in the infant. When bottle feeding and breast feeding differ too much, there is a considerable risk that the infant becomes confused.

For the purpose of taking in milk from a breast, an infant applies two cooperating and interacting mechanisms. A first mechanism is sucking. Negative pressure created by sucking helps the infant to form a teat from the nipple, areola, and underlying breast tissue. Further, an infant may maintain a base under-pressure for the purpose of keeping the teat in the mouth.

An alternating pressure is applied, which contributes to the actual process of retrieving milk from the breast and causing the milk to flow into the infant's mouth.

A second mechanism is the so-called peristaltic tongue movement. During a liquid intake action, an infant performs a peristaltic movement with the tongue. In this process, a wave moving from the tip of the tongue to the back of the tongue is created.

The peristaltic tongue movement has different functions, including transportation of milk and extraction of milk at the exit of the nipple.

In respect of the transportation of milk, in the valley of the wave, milk is transported from the base of the teat to the top of the teat where exit holes are present, while the hill of the wave helps to push the milk.

In respect of the extraction of milk, the valley of the wave creates an increase in volume at the position of the top of the teat, so that under-pressure is obtained. At the same time, the hill of the wave pushes the milk towards the exit.

Many artificial teats are of such a design that liquid is always allowed to flow whenever there is a pressure difference. For example, teats may be of a very simple design, being provided with just one or more small liquid outlet holes that are always open. Alternatively, one or more liquid outlet holes are closed as a default, the closed condition can then easily be changed to an opened condition as soon as the teat is used.

Thus, when a conventional artificial teat is used, a liquid intake action can easily be disrupted by causing choking, gagging, spitting, etc. For instance, any base under-pressure exerted by an infant will also result in a significant flow of liquid.

As this is not the case in breast feeding, this is not expected by the infant. In other cases, the flow could increase suddenly and unnaturally at a certain under-pressure threshold (based on an on-off near binary valve behavior).

Another natural feeding action is non nutritive sucking. When babies pause during a feed and subsequently want to continue drinking, they can stimulate the breast to release milk again by performing non nutritive sucking. This is a behavior that is similar to drinking, but with a higher frequency of tongue movement and vacuum generation, and a lower range of vacuum levels close to a baseline vacuum level. Current teat designs also do not allow a different output of milk based on whether the baby takes a break with a baseline vacuum applied or applies non nutritive sucking.

Teats are typically formed as injection molded silicon components. The molding process only allows a certain precision for the wall thickness. For example, to provide a teat behavior which correctly responds to non nutritive sucking, a wall thickness less than the limit for reliable mass production may be required.

U.S. Pat. No. 5,244,105 discloses a teat with a flat recessed valve slit. WO 98/46191 discloses a teat which can be collapsed. GB 2 215 318 discloses a teat with a recessed valve, having an inwardly domed base. JP 2018/019752 discloses another teat with a recessed valve.

There is a need for a teat design which better emulates the natural breast feeding response to different baby behaviors, and thereby addresses one or more of the issues outlined above. Furthermore, there is a need for a design that can be manufactured with sufficient wall thickness that the design can be produced reliably, with limited variations in product characteristics.

SUMMARY OF THE INVENTION

The invention is defined by the claims.

According to examples in accordance with an aspect of the invention, there is provided a teat for a bottle, comprising:

- a nipple portion having a distal end for insertion into the mouth of a user of the teat, wherein the distal end comprises:
- a recessed portion having a base which is domed outwardly towards the distal end; and
- a valve slit arrangement formed in the base on the recessed portion.

This teat design uses a recessed valve including a valve slit arrangement. The recessed design means there is a portion, for example an outer rim, which projects distally beyond the recessed portion. The outer rim for example extends around the recessed portion. The positioning of the valve in a recess enables the pressure needed to open the valve to be increased. In this way, a baseline vacuum applied by an infant (to retain fixing to a nipple when breast feeding) can be made to be insufficient to open the valve, thereby emulating natural breast feeding more accurately. The recessed valve position also means that deformation of the nipple portion may cause the valve to open by a small amount. In this way, during non nutritive sucking, a reduced flow through the valve will result, and this again emulates the response during breast feeding. The recessed position prevents the valve opening too much and too easily during non nutritive sucking.

In addition to a recessed valve position, the recessed portion is domed outwardly, i.e. it is convex. This shape lowers the opening pressure compared to a flat or oppositely domed (i.e. concave) surface, which in turn enables the teat to be formed as a thicker shaped membrane. A thicker membrane leads to a more gradual increase in flowrate with pressure as well as being easier to manufacture accurately.

The base has an outwardly domed underside and an outwardly domed top side.

Thus, the invention provides a teat which is both easy to manufacture with acceptable tolerances, and also provides a performance which emulates the natural response to infant suckling more closely than existing teat designs.

The nipple portion is for example rotationally symmetric, so that it can be used in any angular orientation without a difference in feeling.

The teat for example comprises a silicone molded component. This a known material and manufacturing method, suitable for teat manufacture.

The base of the recessed portion for example has a wall thickness in the range 0.4 mm to 1.6 mm.

This enables simple manufacture, such that the thickness tolerances in the manufacturing process do not adversely affect the teat performance.

The center of the recessed portion is for example domed towards the distal end compared to an outer edge of the recessed portion by a distance in the range 0.2 mm to 0.8 mm.

The resulting small amount of curvature is simple to manufacture, but provides a suitable change in performance of the valve.

The recessed portion for example has a diameter or width (if it is not circular) in the range 3 mm to 8 mm.

This is a suitable size for a valve portion, and sufficiently large that the recessed portion can be formed reliably by injection molding.

The outer rim of the nipple portion for example has a diameter or width in the range 10 mm to 16 mm.

This is a suitable outer size for a teat nipple.

In a first set of examples, the valve slit arrangement comprises a diagonal slit. The slit may be formed as part of a molding process, or it may be formed after molding.

In a second set of examples, the valve slit arrangement comprises a set of radial slits which end and meet at a central region of the recessed portion. This enables the valve function to be effective for different directions of compression.

In a third set of examples, the valve slit arrangement comprises a set of radial slits which extend from an outer edge (or inset from the outer edge) of the recessed portion towards a center of the recessed portion and terminate before the center of the recessed portion. This again enables the valve function to be effective for different directions of compression but avoids a large central opening at the location where multiple slits converge.

The set of radial slits for example comprises 3, 4 or 5 radial slits. There may instead be non-radial slits. The slits may be straight or curved and there may be multiple parallel or non-parallel slits.

The invention also provides a bottle comprising:

a base container part;

the teat as defined above; and an attachment arrangement for attaching the teat to the remainder of the bottle.

The attachment arrangement for example comprises a securing ring, but other ways of coupling the teat the rest of the bottle are possible, for example a hinged bottle lid.

The bottle for example comprises a baby feeding milk bottle.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
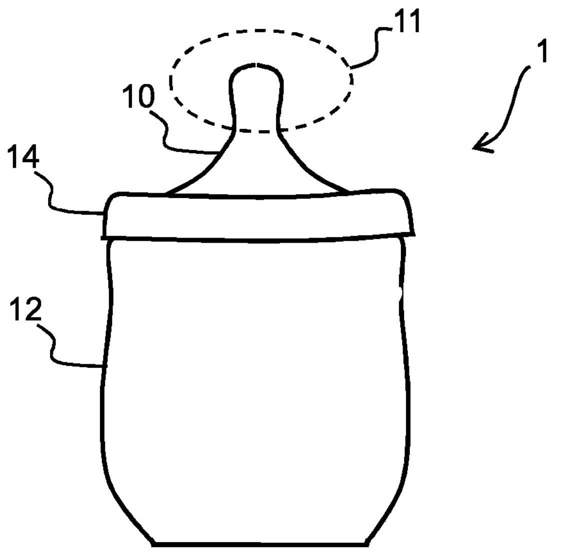
FIG. 1 shows a baby milk feeding bottle which may be adapted in accordance with the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a teat for a bottle having a nipple portion at which there is an inner recessed valve portion. The valve portion is domed outwardly.

FIG. 1 shows a baby milk feeding bottle 1 comprising a teat 10, a base container part 12 and a securing ring 14 for attaching the teat 10 to the base container part 12. The securing ring for example has an aperture through which the teat is received. The securing ring then screws over the base container part, to clamp a base of the teat against a top rim of the base container part.

The teat has a nipple portion 11. This is the portion the infant takes into their mouth to feed. The teat has a valve in the nipple portion 11 to allow milk to be drawn through, when the infant sucks. The teat may for example also have an air vent valve (not shown) to allow air to enter the bottle to replenish the volume of milk drunk by the infant.

To the extent described above, the bottle is conventional. There are many different designs of bottle and teat and this invention may be applied generally to any such design.

The invention involves a modification to the nipple portion 11 of the teat 10. The invention combines two aspects. A first aspect is the position of the valve at the distal end of the teat (the main feeding valve), and a second aspect is the shape of the teat at the position where the main feeding valve is formed.

Figure 2:
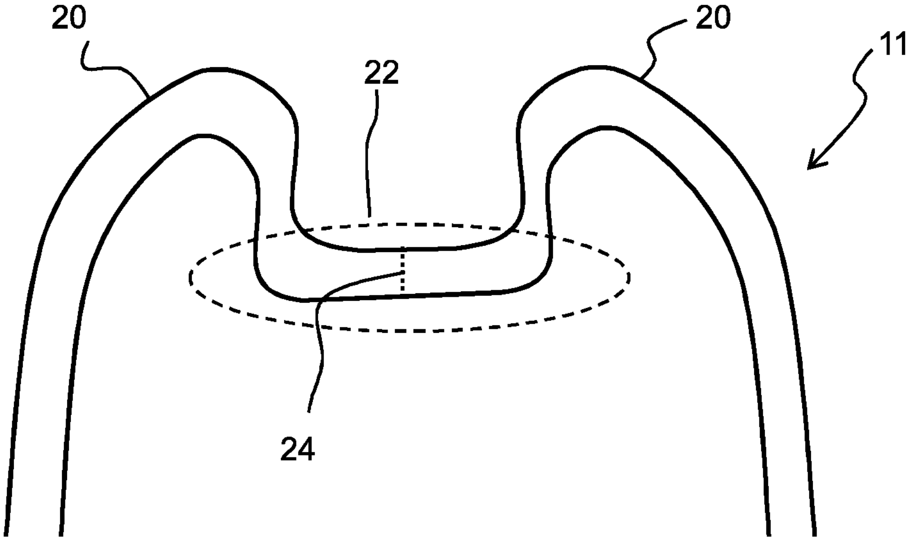
FIG. 2 is used to explain the first aspect of the teat design in accordance with the invention.

FIG. 2 is used to explain the first aspect.

The nipple portion 11 has a distal end for insertion into the mouth of the user of the teat. This distal end has an outer rim 20 and an inner recessed portion 22. The outer rim 20 extends around the inner recessed portion 22 and projects distally beyond the inner recessed portion. A valve is provided having a valve slit arrangement 24 formed in the inner recessed portion.

This teat design thus uses a recessed valve. The positioning of the valve in a recess enables the pressure needed to open the valve to be increased. In this way, a baseline vacuum applied by an infant (to retain fixing to a nipple when breast feeding) can be made to be insufficient to open the valve, thereby emulating natural breast feeding more accurately. The recessed valve position also means that deformation of the nipple portion (rather than sucking) does cause the valve to open by a small amount. In this way, during non nutritive sucking, a reduced flow through the valve will result, and this again emulates the response during breast feeding. The recessed position prevents the valve opening too much and too easily during non nutritive sucking.

FIG. 2 shows the inner recessed portion as planar.

The second aspect relates to the shape of the inner recessed portion 22. In particular, it has been found that the flow which results from an applied pressure is dependent on both the shape of the recessed portion and the thickness of the membrane which forms the teat.

Figure 3:
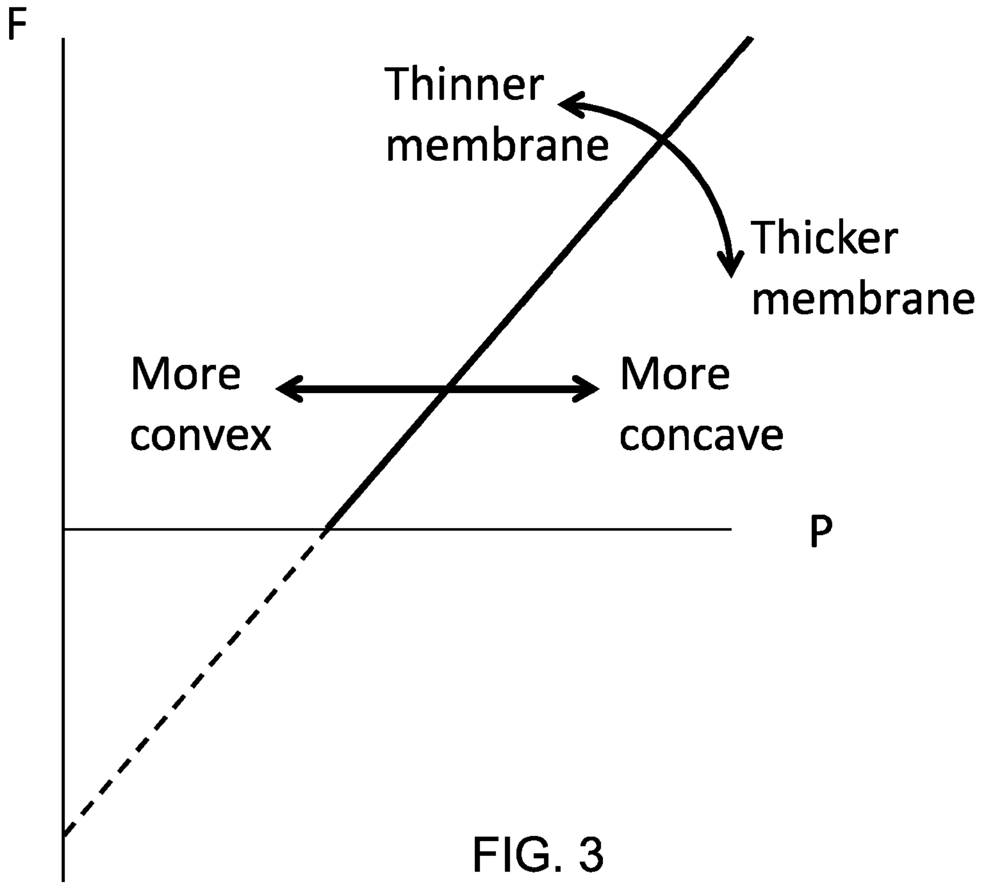
FIG. 3 shows the relationship between flow (y-axis) and under-pressure (x-axis) for the general design of FIG. 2.

FIG. 3 shows the relationship between flow (y-axis) and under-pressure (x-axis), wherein the under-pressure is the suction pressure applied to the nipple portion, i.e. the amount by which the pressure is below the atmospheric pressure inside the bottle. Thus increasing under-pressure P corresponds to an increased suction level.

As expected, the flow increases with under-pressure and the relationship can be approximated as a linear relationship.

However, the crossing point with x-axis, which is a threshold pressure at which the valve starts to open, has been found to depend primarily on the shape of the recessed portion. A convex shape is one which is domed outwardly from the bottle container side, and a concave shape is one which is domed inwardly towards the bottle container side.

It has been found that increasing the convex curvature lowers the threshold pressure and increasing the concave curvature increases the threshold pressure.

It has also been found that the slope of the relationship depends primarily on the thickness of the membrane forming the teat. Increasing the thickness lowers the slope and decreasing the thickness increases the slope. A low slope corresponds to a gradual increase in flow in response to a change in under-pressure, hence a more analogue valve function.

Following from to these findings, the invention additionally provides a teat design which in which the inner recessed portion is domed outwardly towards the distal end, i.e. a convex design. This shape lowers the opening pressure compared to a flat or concave inner recessed portion, which in turn enables the teat to be formed as a thicker shaped membrane. The thicker membrane leads to a more gradual increase in flowrate with pressure as well as being easier to manufacture accurately.

Figure 4:
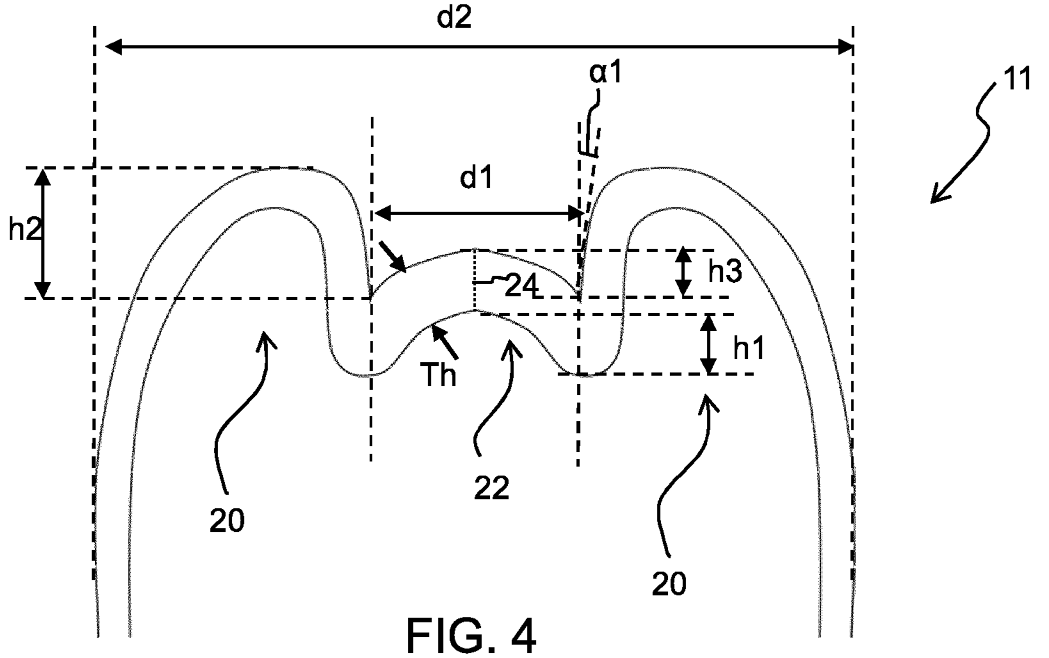
FIG. 4 shows a teat design in accordance with an example of the invention.

FIG. 4 shows a teat design in accordance with an example of the invention. The nipple portion 11 is rotationally symmetric, so that it can be used in any angular orientation without a difference in feeling. It comprises a silicone molded component.

The base of the recessed portion, where the dome shape is formed, for example has a wall thickness Th in the range 0.4 mm to 1.6 mm.

This enables simple manufacture, such that the thickness tolerances in the manufacturing process do not adversely affect the teat performance.

At the underside of the inner recessed portion (the side facing the bottle contents), the center of the underside of the base is for example domed towards the distal end compared to an outer edge of the recessed portion by a distance h1 in the range 0.4 mm to 1.6 mm.

At the top side of the inner recessed portion, the center of the inner recessed portion is for example domed towards the distal end compared to an outer edge of the recessed portion (also facing the distal end) by a distance h3 in the range 0.2 mm to 0.8 mm.

The distance h2 is the depth of the recess and is for example in the range 0.4 to 1.6 mm.

The base thus has an outwardly domed underside and an outwardly domed top side. The amount of doming may be different; this corresponds to a non-uniform thickness of the base (as shown in FIG. 4 it is thicker at the outer edge than in the middle).

The side wall of the recess for example slopes such that it tapers inwardly towards the base of the inner recessed portion with a slope angle $\alpha 1$ which is for example in the range 0 to 10 degrees.

These dimensions for example corresponds to a radius of curvature of the convex inner recessed portion of 2.3 mm to 6.3 mm for a recess of 4.4 mm diameter.

This is simple to manufacture, but provides a suitable change in performance of the valve.

For the example of a circular recessed portion, it for example has a diameter d1 (from above) in the range 3 mm to 8 mm, for example 4 mm to 6 mm.

This is a suitable size for a valve portion, and sufficiently large that the recessed portion can be formed by injection molding.

The outer rim of the nipple portion for example has a diameter d2 in the range 10 mm to 16 mm, for example 12 mm to 14 mm.

This is a suitable outer size for a teat nipple.

Figure 5:
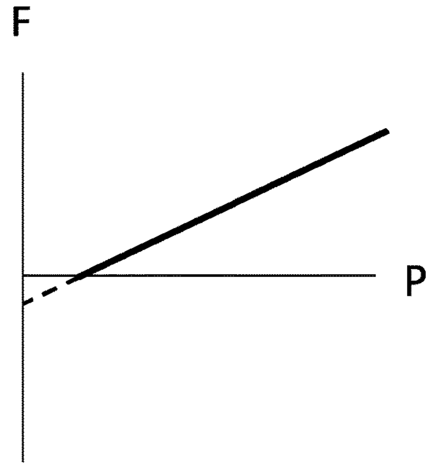
FIG. 5 shows the graph of FIG. 3 for the design of FIG. 4.

FIG. 5 shows the graph of FIG. 3 for the design of FIG. 4.

The flow characteristic matches natural breast feeding more closely because there is a low threshold pressure (so non nutritive sucking will yield some flow) and there is a gradual transition from the closed valve behavior to the open valve behavior.

There are various possible designs for the valve, as shown in FIG. 6.

Figures 6A, 6B, 6C, 6D:
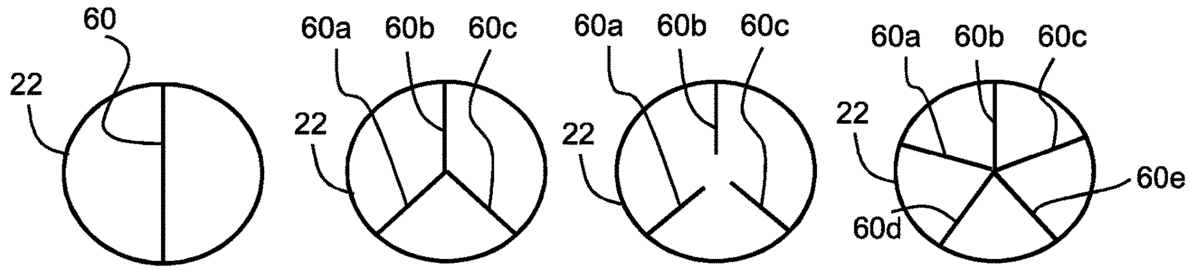
FIG. 6 shows various possible designs for the valve.

FIG. 6A shows a first example in which the valve slit arrangement comprises a diagonal slit 60.

FIG. 6B shows a second example in which the valve slit arrangement comprises a set of three radial slits 60*a*, 60*b*, 60*c* which meet at a center of the inner recessed portion 20. This enables the valve function to be effective for different angular directions of compression.

FIG. 6C shows a third example in which the valve slit arrangement again comprises a set of three radial slits 60*a*, 60*b*, 60*c* but which extend from an outer edge of the inner recessed portion towards a center of the inner recessed portion and terminate before the center of the inner recessed portion. This again enables the valve function to be effective for different directions of compression but avoids a large central opening at the location where multiple slits converge. Thus, it reduced potential leakage.

FIG. 6D shows a fourth example in which the valve slit arrangement comprises a set of five radial slits 60*a*, 60*b*, 60*c*, 60*d*, 60*e* which meet at a center of the inner recessed portion. The set of radial slits for example more generally comprises 3, 4 or 5 radial slits (whether or not they meet at the center).

Figure 6E:
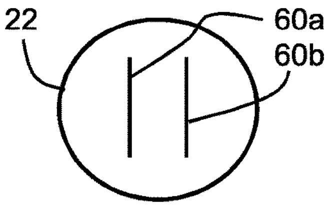

FIG. 6E shows a fifth example in which the valve slit arrangement comprises a set of two parallel slits 60*a*, 60*b* and they do not extend fully to the edge of the inner recessed portion 22.

In each case, the valve slit or slits may be molded or formed after molding.

Figure 7:
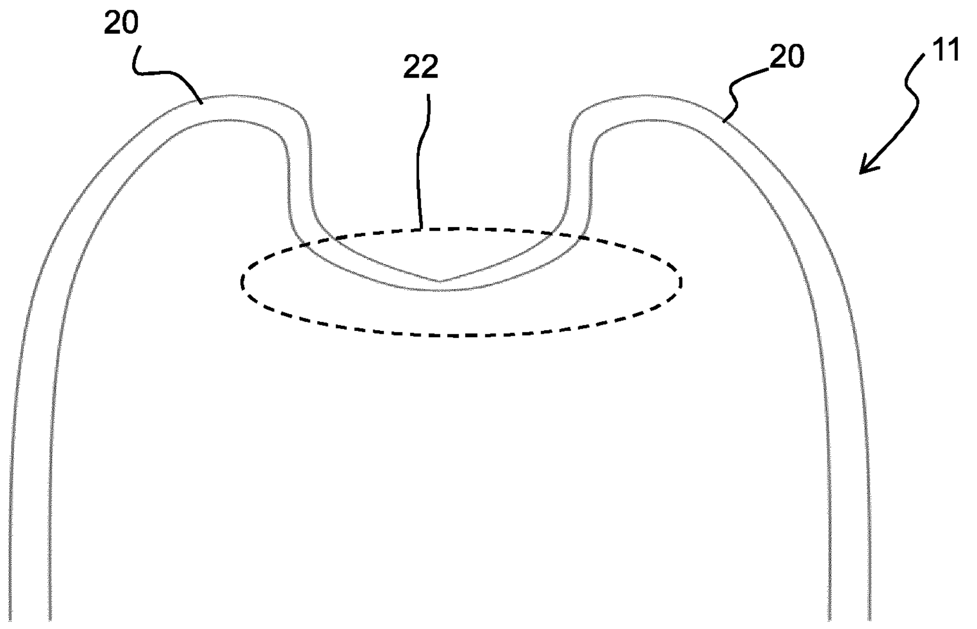
FIG. 7 shows an alternative design (outside the scope of the invention) having a concave recessed portion.

For completeness, FIG. 7 shows an alternative design having a concave inner recessed portion 22.

Figure 8:
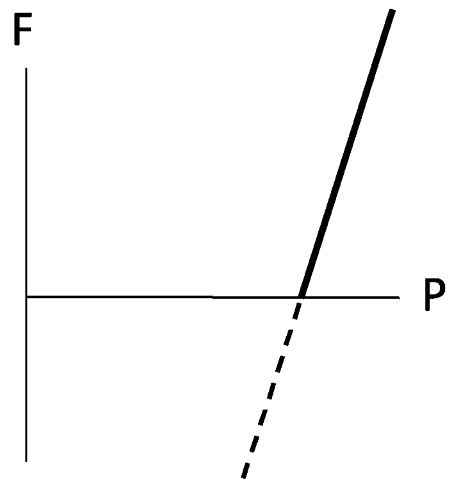
FIG. 8 shows the graph of FIG. 3 for the design of FIG. 7.

The corresponding function of flow versus under-pressure is shown in FIG. 8. This example is outside the scope of the invention. The flow characteristic is less preferred because there is a high threshold pressure and also a more abrupt open-closed behavior of the valve.

The examples above are all based on rotationally symmetric teat designs (with the rotation axis parallel to the height axis of the bottle). Furthermore, they show the nipple portion of the teat centrally located within the teat. They also show the inner recessed portion as an annular enclosed volume. However, these design features are not essential. FIG. 9 shows schematically four alternative teat shapes from above.

Figure 9A:
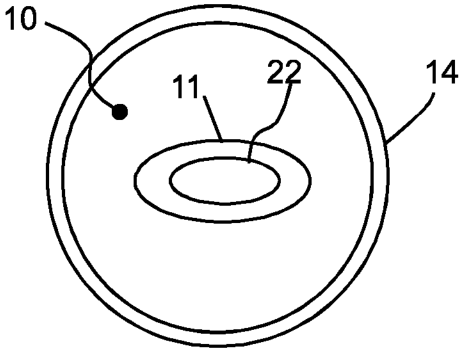
FIG. 9 shows four further alternative teat designs, from above.

FIG. 9A shows a design with an oval nipple portion 11 and a concentric oval inner recessed portion 22. The nipple portion is centrally positioned within the teat 10.

Figure 9B:
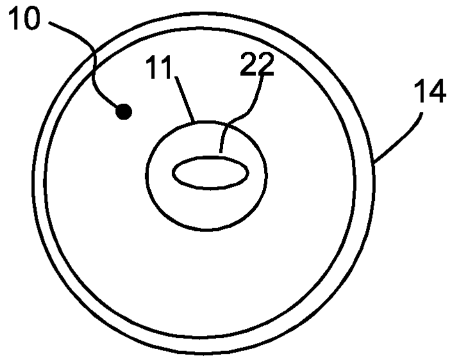

FIG. 9B shows a design with a circular nipple portion 11 but an oval inner recessed portion 22. The nipple portion is again centrally positioned within the teat 10.

Figure 9C:
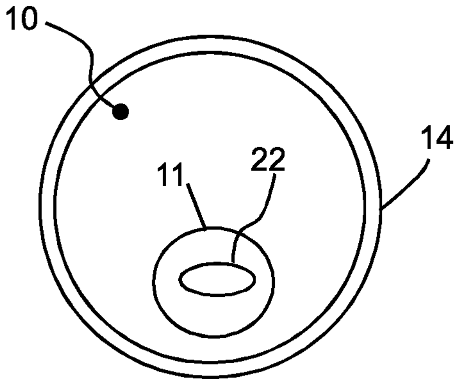

FIG. 9C shows a design with a circular nipple portion 11 but an oval inner recessed portion 22. The nipple portion is in this case offset from the center of the teat 10.

Figure 9D:
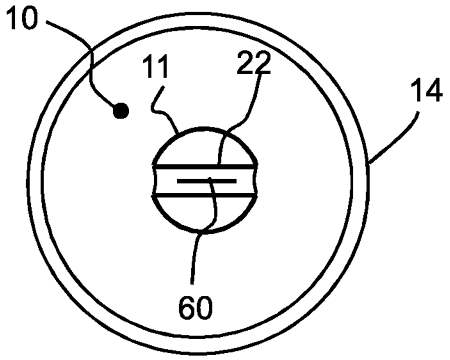

FIG. 9D shows a design with a circular nipple portion 11 but the inner recessed portion 22 is a recessed linear channel open at its ends (which may have the same cross section across the channel as shown in FIG. 4), rather than a closed shape such as a circle or oval.

The oval shapes may be considered to have a "width" which is the largest linear dimension, e.g. the length of the major axis.

The examples above all show the recessed portion and the valve at the top of the nipple portion, and they show rotationally symmetric nipple portion. These design features are also not essential. FIG. 10 shows schematically two alternative teat shapes from the side.

Figure 10A:
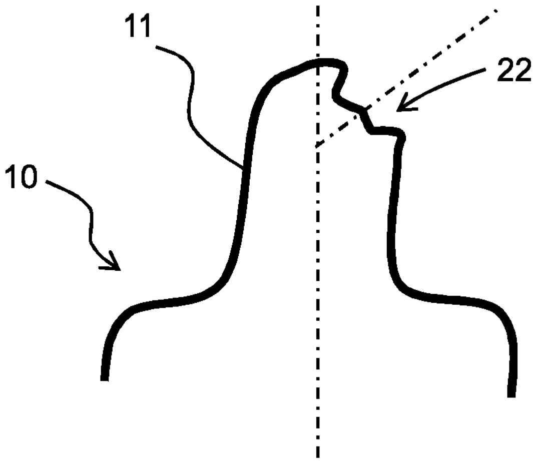
FIG. 10 shows two further alternative teat designs, from the side.
Figure 10B:
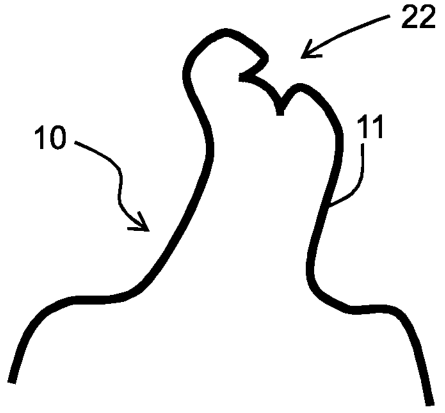

FIG. 10A shows that the inner recessed portion 22 may extend laterally at the top of the nipple portion 11. The general shape of the teat remains rotationally symmetric about the height axis.

FIG. 10B again shows a lateral inner recessed portion 22 and additionally shows that teat may have any desired non-symmetrical shape.

In all examples above, the edges between recess and the remainder of the teat has a minimum radius, for ease of cleaning. The slits may be straight as in the examples above, but they may be curved.

The invention has been described with reference to a baby bottle for milk feeding. It may be applied equally to toddler cups for other drinks.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A teat for a bottle, comprising:

a nipple portion having a distal end for insertion into a mouth of a user of the teat, wherein the distal end comprises:

a recessed portion having a base which is domed outwardly towards the distal end, wherein; the base has an outwardly domed underside and an outwardly domed top side; the distal end has an outer rim having a first height; and the outwardly domed base of the recessed portion has a second height, which is less than the first height; and a valve slit arrangement formed in the base of the recessed portion.

2. The teat as claimed in claim 1, wherein the nipple portion is rotationally symmetric.

3. The teat as claimed in claim 1, wherein the base of the recessed portion has a wall thickness (Th) in a range of 0.4 mm to 1.6 mm.

4. The teat as claimed in claim 1, wherein the first distance (h3) is in a range of 0.2 mm to 0.8 mm.

5. The teat as claimed in claim 1, wherein the second distance (h2) in a range of 0.4 mm to 1.6 mm.

6. The teat as claimed in claim 1, wherein the recessed portion has a diameter (d1) or a width in a range of 3 mm to 8 mm.

7. The teat as claimed in claim 1, wherein an outer rim of the nipple portion has a diameter (d2) or a width in a range of 10 mm to 16 mm.

8. The teat as claimed in claim 1, wherein the valve slit arrangement comprises a diagonal slit.

9. The teat as claimed in claim 1, wherein the valve slit arrangement comprises a set of radial slits which end and meet at a central region of the base of the recessed portion.

10. The teat as claimed in claim 1, wherein the valve slit arrangement comprises a set of radial slits which extend from an outer edge of the base of the recessed portion, or spaced from an outer edge of the base of the recessed portion, towards a central region of the base of the recessed portion and terminate before they meet.

11. The teat as claimed in claim 9, wherein the set of radial slits comprises 3, 4, or 5 radial slits.

12. The teat as claimed in claim 1, wherein the valve slit arrangement comprises one or more slits which are spaced from the outer edge of the base of the recessed portion.

13. A bottle comprising:

a base container part;

the teat as claimed in claim 1; and an attachment arrangement for attaching the teat to a remainder of the bottle.

14. The bottle as claimed in claim 13, wherein the attachment arrangement comprises a securing ring for attachment to the base container part.

15. A bottle as claimed in claim 13, wherein the bottle is a baby feeding milk bottle.

* * * * *